United States Patent [19]

Semence

[11] 4,336,779

[45] Jun. 29, 1982

[54] CARBURATION DEVICES

[75] Inventor: Pierre Semence, Plaisir, France

[73] Assignee: Societe Industrielle de Brevets et d'Etudes S.I.B.E., Neuilly-sur-Seine, France

[21] Appl. No.: 131,672

[22] Filed: Mar. 19, 1980

[30] Foreign Application Priority Data

Mar. 22, 1979 [FR] France .............................. 79 07309

[51] Int. Cl.³ .................... F02M 7/00; F02M 23/04; F02D 5/00; F02D 1/04
[52] U.S. Cl. .................................. 123/339; 123/440; 123/585; 123/586; 123/588; 261/DIG. 19; 261/DIG. 78; 261/121 B
[58] Field of Search ............... 123/339, 585, 588, 586, 123/440; 261/DIG. 19, DIG. 121 B, DIG. 78

[56] References Cited

U.S. PATENT DOCUMENTS

| | | | |
|---|---|---|---|
| 3,548,792 | 12/1970 | Palmer | 261/121 B |
| 3,601,106 | 8/1971 | Nakajima | 123/339 |
| 4,146,595 | 3/1979 | Szott et al. | 123/339 |
| 4,173,956 | 11/1979 | Ikeura et al. | 261/121 B |
| 4,203,395 | 5/1980 | Cromas et al. | 123/339 |
| 4,217,313 | 8/1980 | Dmitrievsky et al. | 261/DIG. 78 |
| 4,237,838 | 12/1980 | Kinngawa et al. | 123/339 |
| 4,242,994 | 1/1981 | Keely | 123/339 |

Primary Examiner—Raymond A. Nelli
Attorney, Agent, or Firm—John T. Synnestvedt; Albert L. Free

[57] ABSTRACT

An idling circuit for a carburation device comprises an idling duct for supplying a primary air-fuel mixture downstream of the throttle and a fueled-air line having an adjustable cross-section for circulating an additional quantity of air and primary mixture from upstream to downstream of the throttle. A solenoid valve is energized by pulses having a duty cycle which is controlled so as to keep the engine speed near a set idling speed and so as to increase the amount of mixture supplied to the engine during deceleration at high speed.

6 Claims, 4 Drawing Figures

CARBURATION DEVICES

BACKGROUND AND SUMMARY OF THE INVENTION

The invention relates to carburation devices for internal combustion engines, of the type having an idling circuit opening into that part of the induction passage which is downstream of a throttle actuated by the operator, said idling circuit comprising an idling duct through which a primary fuel-air mixture is delivered to the induction passage downstream of the throttle, at least when the latter is in its minimum opening position leaving an air flow passage between the throttle and the induction passage wall, and a channel having an adjustable cross-sectional area for delivery of an additional quantity of air enriched with primary air-fuel mixture to flow from upstream to downstream of the throttle.

According to the invention, there is provided a carburation device comprising a solenoid valve having two positions, disposed in the path of at least a fraction of said additional fuel enriched air, and a solenoid valve control circuit comprising an engine speed probe and which in operation supplies the solenoid valve with electric pulses with a variable duty cycle so as to prevent the engine speed from falling substantially below a given idling speed and to give the solenoid valve a duty cycle in dependence on the engine speed above a preset value thereof, during deceleration of the engine fed by the carburator device.

Advantageously the solenoid valve is of the kind which takes up a fully open position when energized and a minimum non-zero closed position when de-energized.

The pulse supply circuit can be designed so that the preset idling speed can be slightly varied in dependence on an engine operating parameter, inter alia the temperature of a cooling or lubricating fluid. It is known that, until the engine has reached its operating temperature, it should preferably be given an idling speed above the normal idling speed.

The solenoid valve energization circuit will normally detect deceleration as a result of the simultaneous presence of two input signals, one indicating that an accelerator pedal is at rest and the other that the engine speed exceeds a preset value. On a car the engine speed can be measured directly, or the output speed of the driving shaft can be measured, subject to the additional condition that the gearbox is at the higher ratio.

The invention will be better understood from the following description of a carburation device constituting an embodiment, given by way of example. The description refers to the accompanying drawings.

SHORT DESCRIPTION OF THE DRAWINGS

Figure 3:
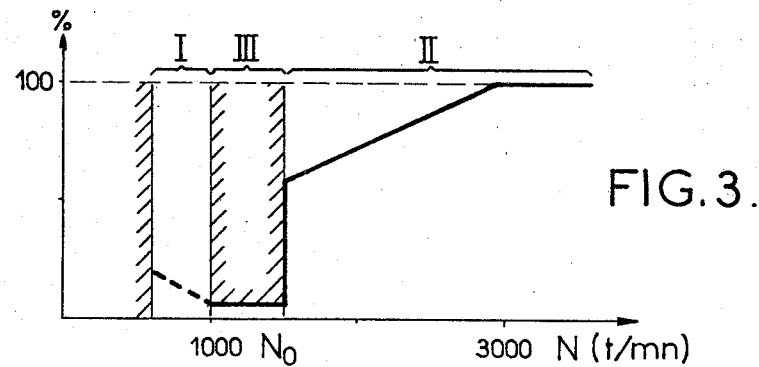
Figure 4:
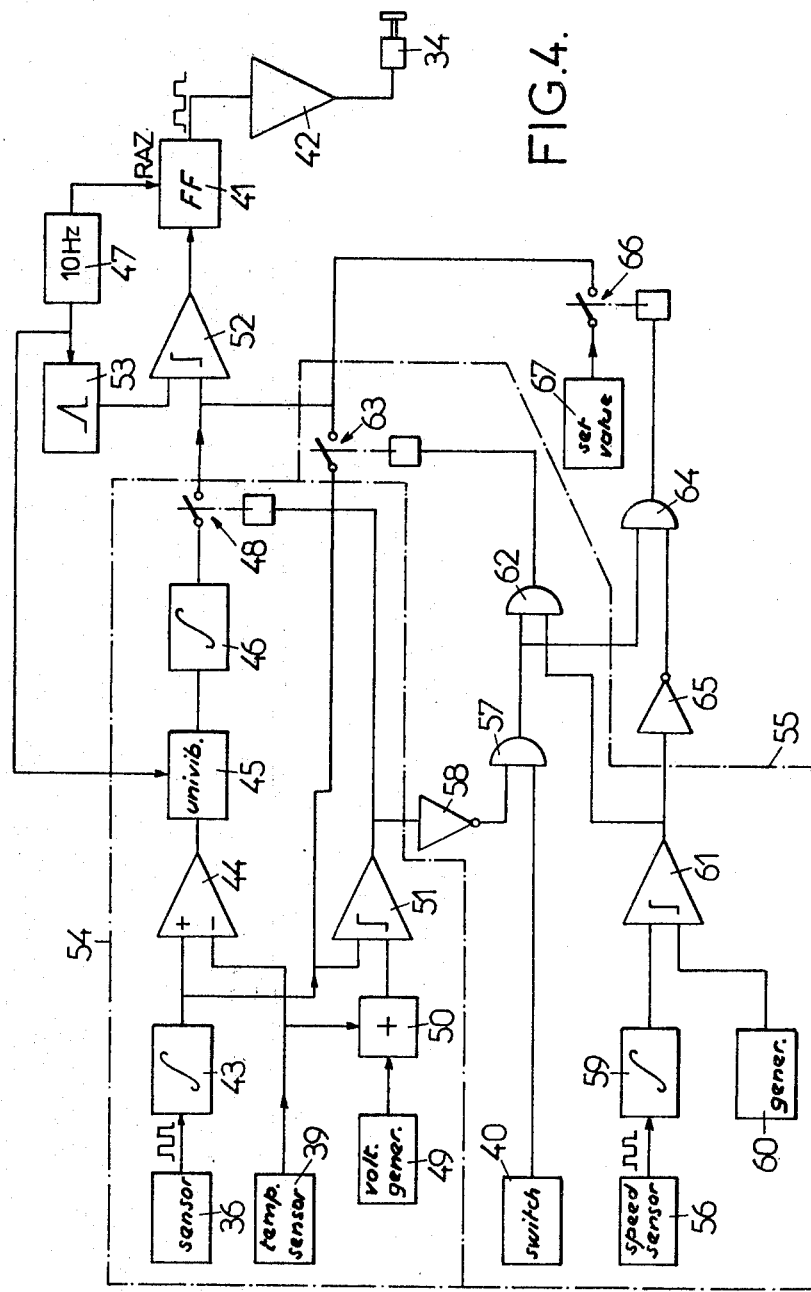

FIG. 3 diagrammatically shows the variation in the duty cycle of the solenoid valve, expressed as a percentage, in dependence on the engine speed N, and FIG. 4 is a block diagram of a circuit which can be used to control the solenoid valve.

DETAILED DESCRIPTION OF AN EMBODIMENT

Figure 1:
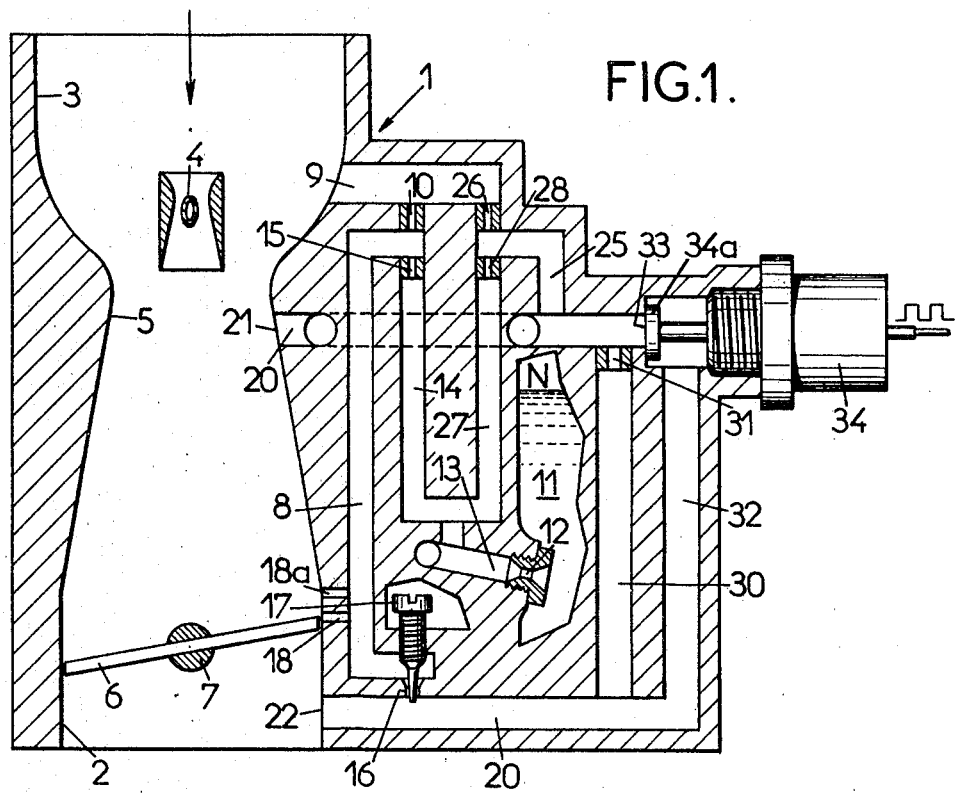
FIG. 1 is a diagram in vertical section of a carburation device, showing the components relevant to the invention.

Referring to FIG. 1, a carburation device 1 comprises a circuit for supplying fuel during normal operation and an idling circuit, both opening into an intake or induction passage 2. In the direction of air flow shown by an arrow there are provided an air inlet 3, a main fuel jetting circuit whose end portion 4 opens into the throat of a main venturi 5, and a throttle 6 consisting of a butterfly valve carried by a shaft 7. Shaft 7 extends through the body of the carburetor and is connected to an operator operable control linkage (not shown).

The idling circuit can be regarded as comprising an idling duct 8 and a passageway 20 for delivering air containing a low amount of fuel, which will be referred to as a fueled air passageway.

Duct 8 is connected upstream to the air inlet 3 via a passage 9 and a calibrated orifice 10. It is also connected to a float chamber 11 (partly shown) in which fuel is at a constant level N, via a main fuel jet 12, a main fuel duct 13 (which also supplies the main fuel jet system 4), a passageway 14 and a calibrated orifice 15. The idling duct 8 opens downstream into the fueled air passageway 20 through a port 16. The flow cross sectional area offered by port 16 can be adjusted by means of a screw 17 retained by means (not shown).

Idling duct 8 opens into passage 2 via transfer ports 18a, 18 disposed so as to be located successively upstream and downstream of the edge of butterfly 6 when the latter opens slightly beyond the minimum opening position shown in FIG. 1.

The fueled air passageway 20 is supplied with air from the induction passage 2. It opens upstream near the throat of venturi 5, via an opening 21, and terminates downstream, via a port 22, in the part of passage 2 downstream of butterfly 6.

Since the outlet port 16 of idling duct 8 ends in the downstream portion of the fueled air passageway 20 the primary or rich fuel/air mixture supplied by duct 8 is diluted by the additional idling air supplied by passageway 20, as described in French Patent Specification No. 1 507 233, to which reference may be made.

A passageway 25 for supplying a rich or primary fuel/air mixture opens into the upstream part of passageway 20. Passageway 25 is connected (a) to the air inlet 3 via passage 9 and a calibrated orifice 26 and (b) to the main fuel duct 13 via a channel 27 and a calibrated orifice 28.

In the embodiment of the invention shown in FIG. 1, the air which is loaded with fuel in the upstream part of the fueled air passageway 20 flows to the part of passageway 20 via a first fueled air channel 30 having a flow cross section calibrated by a fixed-section fueled air orifice 3 and via a second fueled air channel 32 mounted in parallel flow relation with channel 30 and having a flow cross section 33 controlled by the movable part 34 of a solenoid valve 34 receiving periodical pulses from an electronic control circuit 35.

Figure 2:
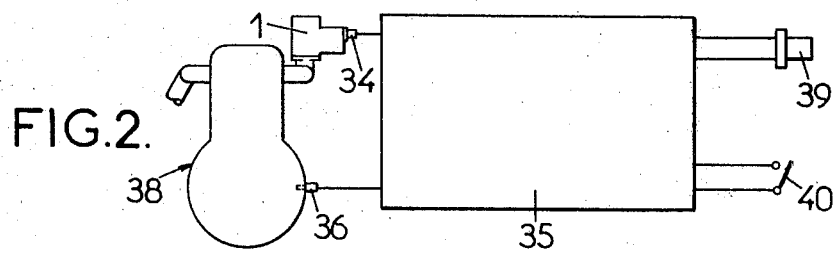
FIG. 2 is a block diagram showing the carburation device in association with the engine and the control circuit.

Referring to FIG. 2, the electronic control circuit 35 comprises a speed pickup 36. The pick-up is disposed e.g. so as to supply a pulse at each turn of the flywheel of engine 38. It also comprises a switch 40 which is in open condition when the accelerator pedal is released. The circuit can comprise pick-up probes adapted to supply an electric signal representing additional engine parameters. It may inter alia comprise a temperature probe 39 immersed e.g. in the cooling water circuit.

Valve 34 has been shown only diagrammatically. It will be assumed that it is in a closed or minimum opening condition, as shown in FIG. 1, when non-energized and in a fully open condition when energized by an electric current. The flow rate through the second fueled air channel 32 will be in direct relation to the duty cycle of valve 34, equal to the duty cycle of the pulses provided by circuit 35.

Circuit 35 is for preventing the engine stalling when loaded during idling; it is also for preventing pollution during deceleration. A desired type of operation is diagrammatically shown in FIG. 3, where those operating ranges which are to be avoided are indicated by cross-hatching.

Idling is regulated during operation as follows. If the engine, rotating at the normal idling speed of e.g. 800 rpm, is abruptly loaded, the speed tends to decrease. Pick-up 36 supplies circuit 35 with an electric signal which reflects the variation and the circuit responds by increasing the duty cycle of the pulses applied to solenoid valve 34. The flow rate of fuel/air mixture supplied to the engine increases and the engine speed tends to return to its initial value. When the temporary load is taken off the engine, the reverse process occurs.

When the engine is cold, operation may be rendered slightly different due to operation of the starting and cold-running system normally provided in carburation devices.

As is seen, the device is a true servo circuit which operates in closed loop to prevent the idling speed from deviating appreciably from a preset value. That operation corresponds to the broken line in speed range I of FIG. 3, in the case of a loop having a predetermined gain of finite value.

Operation during deceleration is represented by range II in FIG. 3. Such operation occurs when the engine speed, given by pick-up 36 (or the vehicle speed in other embodiments) exceeds a set value $N_O$ and contactor 40 is simultaneously open. The engine speed $N_O$ will be e.g. 1500 rpm.

When circuit 35 detects that the two conditions are simultaneously fulfilled, it adjusts the duty cycle at a value which increases with speed. Thus, the engine is supplied with an additional quantity of air-fuel mixture which increases with the engine speed. The relation between the engine speed and the duty cycle of the solenoid valve is selected so as to produce a maximum decrease in pollution by exhaust gas. If required, the relation can be corrected by temperature data supplied by probe 39.

Circuit 35 is typically adapted so that, during deceleration in an intermediate speed range (range III) in FIG. 3, valve 34 has a predetermined duty cycle which is sufficiently low to prevent excessive reduction in the braking action of the engine.

In practice, the flow rate of air-fuel mixture to be admitted by the second fueled-air channel 32 during the idling regulation phase is much less than the quantity required during deceleration. If the solenoid valve is designed so that it has to be kept permanently open during deceleration beyond a given speed (100% duty cycle), the duty cycle will be much lower and will generally not exceed 20% during idling. In the example diagrammatically shown in FIG. 3, operation during deceleration in range II occurs at a minimum duty cycle of about 60%.

In a device according to the invention, manual adjustment of engine idling speed becomes unnecessary, since the desired speed can be directly set in the electronic control circuit 35.

Numerous embodiments of the electronic control circuit may be designed, either analog or digital.

FIG. 4 is a block diagram of a circuit which may be used. The diagram is simplified (particularly by omitting the shaping circuits or converters downstream of the pick-up probes).

The circuit may be regarded as comprising a common power trunk made up of a flip flop 41 and a power amplifier 42 and two branches, one for idling regulation and the other for operation during deceleration.

The idling channel 54 in the illustrated circuit can be designed for adjusting the speed at a set value which varies with the engine temperature. Starting from an engine speed pick-up 36, the branch comprises an integrator 43 connected to one input of a differential amplifier 44 supplying a deviation signal. The second input of the amplifier receives the output signal of an assembly comprising a temperature probe 39 and a conversion circuit supplying the set value of the idling speed. The deviation signal supplied by amplifier 44 is applied to the duration-setting input of a monostable 45. The trigger input of monostable 45 receives the output signals of a clock 47, e.g. at 10 Hz which is common to the two channels and also connected to the reset input of flip-flop 41. The output square waves of monostable 45 are fed to an integrator 46 to supply a d.c. signal.

The action of the idling-regulating branch must be inhibited outside range I (FIG. 3). To this end, a cut-off means, shown diagrammatically in the form of a relay 48, is placed downstream of integrator 46. The relay coil is controlled by a circuit having provision for adjustment of the width of range I. That circuit comprises a voltage generator 49 defining the width of the range. In order to allow for the variation in the set idling speed with temperature, the range is offset in dependence on temperature by an adder 50. The voltage supplied by generator 49 is typically selected so that the range width is about 100 rpm.

The output signal of the adder, representing the upper limit of range I, is applied to one input of a comparator 51 whose other input receives the output signal of integrator 43. If the comparison indicates that operation occurs in range I, the comparator supplies a closure signal to relay 48, which connects the idling-regulating branch to the power circuit.

Thereupon, the output signal of integrator 46 is applied to one input of a trigger pulse control circuit comprising a comparator 52, whose other input receives voltage ramp signals provided by a triggerable ramp generator 53 whose trigger input is connected to the output of clock 47.

The comparator is of a kind which supplies an output pulse whenever the ramp voltage exceeds the voltage from integrator 46. The leading edge of the pulse triggers flip flop 41, which is reset by clock 47 at the same time as the ramp generator 53.

The duty cycle of the pulses supplied by flip flop 41 is thus directly related to the frequency of the pulses from the speed pick-up 36

In the embodiment illustrated in FIG. 4, deceleration branch 55 comprises two pick-up probes. Probe 40 picks up the position of the accelerator pedal whereas the other probe 56 picks up the speed of the vehicle and acts only when the gearbox is at the higher ratio. The output of pick-up 40 is connected to one input of an AND gate 57 which inhibits operation of the branch during idling, i.e. in range I. To this end, the second input of AND gate 57 receives the output signal of comparator 51, after inversion in an inverter 58. The output signal of pick-up 56 is integrated at 59 and the resulting d.c. signal is compared in a comparator 61 with a set value supplied by a generator 60. If the comparison indicates that the speed is above the lower limit of range II (e.g. 35 km/h), comparator 61 supplies an output voltage. Simultaneous occurences of the output voltages of comparator 61 and AND gate 67 is detected by an AND gate 62. The presence of an output signal from gate 62, indicating deceleration at high speed, results in closure of a switch 63 for which renders the deceleration branch operative. Again that branch receives the output signals of the motor speed pick-up 36.

The circuit diagrammatically illustrated in FIG. 4 is further designed for giving the solenoid valve a constant duty cycle in range III. For that purpose, it comprises an AND gate 64 similar to gate 62 and, like 62, receiving the output signal from AND gate 57. However, the second input of gate 64 does not receive the signal directly supplied by comparator 61, but the signal, inverted in an inverter 65. When AND gate 64 supplies an output signal indicating that the engine speed is lower than the threshold of range II (e.g. 35 km/h), it closes a switch 66, resulting in the application of a preset d.c. voltage supplied by a set-value generator 67 to comparator 52. The output voltage of generator 67 determines the duty cycle of solenoid valve 34 throughout the operating range III.

Numerous circuits other than that illustrated in FIG. 4 may be used and the functions may be fulfilled by a digital processing system which also serves other purposes.

I claim:

1. A carburetion device for internal combustion engine comprising:
    a body formed with an induction passage for delivering an air/fuel mixture to an engine,
    operator operable throttle means in said induction passage,
    an idling duct connected to receive air from said induction passage and fuel from a float chamber through respective calibrated orifices and opening into said induction passage at a point which is located slightly upstream of the throttle means when the latter is in its minimum opening position,
    passageway means connected to receive air and fuel to form a primary air/fuel mixture and to receive dilution air from said induction passage, said passageway means having an outlet opening into said induction passage at a location which is continuously downstream of the throttle to deliver an air/fuel mixture to said induction passage and by passage said throttle means, said passageway means having a common downstream portion supplied by two parallel branches one of which comprises a first channel formed with a calibrated orifice having a fixed flow cross-sectional area and the other of which comprises a second channel controlled by the solenoid valve,
    said idling duct additionally having a downstream portion which opens into said passageway means through a calibrated port for delivery of an additional amount of primary air/fuel mixture into said passageway means,
    a solenoid valve having two positions and located on said passageway means at a location which is downstream of dilution air delivery into said passageway means and upstream of primary air/fuel mixture delivery into said passageway means,
    and a solenoid valve control circuit comprising engine speed sensing means and means for detecting deceleration of the engine, arranged and operating to supply the solenoid valve with energizing pulses having a variable duty cycle to prevent the engine speed from falling substantially below a set idling value and to give the solenoid valve a duty cycle which increases with the speed of the engine during engine deceleration above a preset speed ($N_O$).

2. A device according to claim 1, characterised in that said solenoid valve is of the type which is in full-open position when energized, and in non-zero closed position when de-energized.

3. A device according to claim 1, characterised in that the idling duct opens into said common downstream portion.

4. A device according to claim 1, wherein the solenoid valve control circuit comprises means for supplying the valve with electric pulses having a duty cycle varying inversely with speed in a speed range of the engine near the normal idling speed of said engine and extending up to a second preset value above said idling value.

5. A device according to claim 4, wherein the solenoid valve control circuit further comprises means for giving the valve a duty cycle which increases with engine speed when the speed is above said preset value ($N_O$) and inhibition means causing continuous de-energization of the solenoid valve above the preset value when said means for detecting deceleration, which comprises a sensor for detecting location of said throttle means, indicate that said throttle means is in a position other than the minimum opening position.

6. A device according to claim 5, characterised in that the control circuit is adapted to provide the solenoid valve with pulses having a predetermined duty cycle during deceleration when the engine speed is above the second preset value and below said preset value ($N_O$).

* * * * *